2,960,504
1-HYDRAZINO, 4-PYRIDYL METHYL-PHTHALAZINES

Jean Druey, Riehen, and Adrian Marxer, Basel, Switzerland, assignors to Ciba Pharmaceutical Products Inc., Summit, N.J.

No Drawing. Filed Apr. 16, 1958, Ser. No. 728,759

Claims priority, application Switzerland May 7, 1957

7 Claims. (Cl. 260—250)

This invention relates to new phthalazine compounds. More particularly, the invention concerns 1-hydrazino-4-(pyridyl-methyl)-phthalazines and salts thereof, preferably 1-hydrazino-4-[pyridyl-(2')-or pyridyl-(4')-methyl]-phthalazines.

The new compounds may contain further substituents, particularly on the benzene nucleus, e.g. amino groups, acylamino group, such as lower alkanoylamino groups, e.g. acetylamino groups, nitro groups, alkyl groups, such as lower alkyl groups, e.g. methyl groups, or alkoxy groups, such as lower alkoxy groups, e.g. methoxy groups, or halogen atoms, e.g. chlorine or bromine.

The new phthalazines possess valuable pharmacological properties. They exhibit a pronounced hypotensive action and are useful as therapeutic agents for lowering the blood pressure. Especially advantageous in this respect is 1-hydrazino-4-[pyridyl-(4')-methyl]-phthalazine of the formula

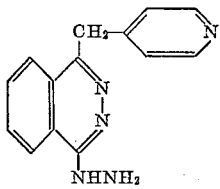

which thus is a specific and preferred embodiment of this invention, and salts thereof.

The new phthalazines can be obtained by reacting a 1-chloro-4-(pyridyl-methyl)-phthalazine with hydrazine.

The aforesaid reaction is carried out in the usual manner in the presence or absence of a diluent, and if desired in the presence of a condensing agent.

Resulting compounds containing an acylamino-group may be hydrolyzed in the usual way to yield the corresponding compounds containing a free amino group.

Depending on the procedure used the new hydrazine compounds are obtained in the form of the free bases or salts thereof. From the salts the free bases may be obtained in known manner. From the free bases acid additions salts can be made by reaction with acids that are suitable for forming therapeutically useful salts, for example, hydrohalic acids, sulfuric acid, nitric acid, phosphoric acid, thiocyanic acid, acetic acid, propionic acid, oxalic acid, malonic acid, succinic acid, citric acid, tartaric acid, malic acid, methane sulfonic acid, ethane sulfonic acid, hydroxyethane sulfonic acid, benzene or toluene sulfonic acid, amino-acids or therapeutically active acids.

The new hydrazino-phthalazines and their salts can be used in the form of pharmaceutical preparations, which contain the active compound in admixture with a pharmaceutical organic or inorganic carrier material suitable for enteral or parenteral administration. For making the carrier there are used substances that do not react with the new compounds, for example, water, gelatine, lactose, starches, stearates, talc, vegetable oils, benzyl alcohols, gums, polyalkylene glycols or other known carriers for medicaments. The pharmaceutical preparations may be, for example, in the form of tablets, dragees, pearls, capsules or in liquid form as solutions, suspensions or emulsions. If desired, they may be sterilized and/or may contain auxiliary substances, such as preserving, stabilizing, wetting or emulsifying agents, salts for regulating the osmotic pressure or buffers. They may also contain other therapeutically valuable substances. These preparations contain preferably from about 0.5%–45% of the active 1-hydrazino-4-(pyridyl-methyl)-phthalazine compound.

The following examples illustrate the invention:

Example 1

Crude 1-chloro-4-[pyridyl-(4')-methyl]-phthalazine, obtainable from 14.2 grams of 1-oxo-4-[pyridyl-(4')-methyl]-1:2-dihydrophthalazine in the manner described below is dissolved in 60 cc. of methanol and 54 cc. of hydrazine hydrate, and the solution is boiled for one hour on a water bath under reflux.

The solution is evaporated under reduced pressure and the residue is freed to a great extent from hydrazine hydrate by heating it at 60° C. under 12 mm. pressure, and is then dissolved in 250 cc. of absolute ethanol. The solution is filtered and again evaporated to dryness in vacuo. The residue is dissolved in 250 cc. of absolute ethanol, and the solution is filtered and mixed with 60 cc. of a 2.75 N solution of hydrochloric acid in ethanol. Yellow-brown crystals are obtained which are isolated and recrystallized from 400 cc. of ethanol of 95% strength with the addition of about 20 parts of water. There is obtained the easily water-soluble 1-hydrazino-4-[pyridyl-(4')-methyl]-phthalazine dihydrochloride of the formula

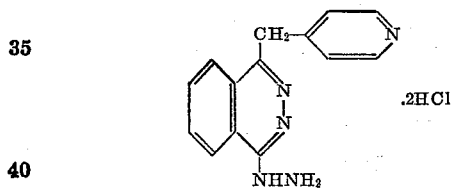

in the form of a monohydrate melting at 279–281° C. From the dihydrochloride there can be obtained by treatment with the calculated quantity of caustic soda solution the free base melting at 287–289° C. (after liquefaction at 88–133° C. followed by solidification at 183° C).

The 1-chloro-4-[pyridyl-(4')-methyl]-phthalazine used as starting material can be prepared as follows:

44.6 grams of the compound (γ-pyrophthalone) obtainable by condensing phthalic anhydride with 4-methyl-pyridine, are heated with 200 cc. of hydrazine hydrate for 3 hours in an oil bath at 135° C. under reflux. The crystals which separate on cooling are filtered off with suction and recrystallized from ethanol. There is obtained 1-oxo-4-[pyridyl-(4')-methyl]-1:2-dihydro-phthalazine in the form of yellowish crystals melting at 208–210° C. This compound forms a hydrochloride melting at 280–282° C.

14.2 grams of 1-oxo-4[pyridyl-(4')-methyl]-1:2-dihydrophthalazine are heated with 60 cc. of phosphorus oxychloride for 2½ hours on a water bath. The violet solid lumps so obtained and the phosphorus oxychloride are slowly poured on to ice, and the resulting violet solution is run in a thin jet into a mixture of 450 cc. of water and 270 cc. of concentrated ammonia solution while stirring vigorously and cooling. The internal temperature must not rise above 10° C. The reddish precipitate is filtered off with suction, washed thoroughly with water and dried by suction. The 1-chloro-4-[pyridyl-(4')-methyl]-phthalazine so obtained is used directly in the process described above. By reprecipitation from ethanol it may, if desired, be purified, and it then melts at 170° C.

Example 2

Crude 1-chloro-4-[pyridyl-(2')-methyl] - phthalazine, which has been obtained by heating for 2½ hours under reflux 14.2 grams of 1-oxo-4-[pyridyl-(2')-methyl]-1:2-dihydro-phthalazine with 60 cc. of phosphorus oxychloride in an oil bath having a temperature of 125° C. and working up as described in Example 1, is boiled under reflux with 120 cc. of methanol and 108 cc. of hydrazine hydrate for one hour on the water bath. The methanol and the hydrazine hydrate are completely evaporated under a pressure of 12 mm. and the residue is dissolved twice in 250 cc. of absolute ethanol and evaporated to dryness, and again dissolved in 250 cc. of absolute ethanol. 70 cc. of a 2.3 N solution of hydrochloric acid in ethanol are added to the solution, and after a few hours the mixture is filtered with suction to remove a small amount of a reddish precipitate. The filtrate is completely evaporated to dryness, and the residue is covered with 25 cc. of absolute ethanol and the solution is allowed to crystallize. The crystals are isolated and recrystallized from ethanol of 95% strength. The resulting, easily water-soluble 1-hydrazino-4-[pyridyl-(2')-methyl]-phthalazine dihydrochloride of the formula

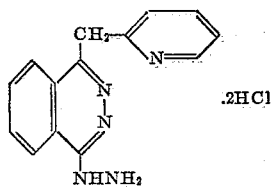

forms a monohydrate. It melts at 230–232° C. accompanied by frothing. The melt then resolidifies and melts again at 290° C.

The 1-oxo-4-[pyridyl-(2')-methyl]-1:2-dihydro phthalazine used as starting material is obtained from the condensation product (α-pyrophthalone) obtained by reacting phthalic anhydride with 2-methyl-pyridine in the manner described in Example 1 for the corresponding pyridyl-(4)-methyl-compound. It melts at 179–182° C., and its hydrochloride melts at 261–264° C.

Example 3

16.5 g. of 1-oxo-4-[pyridyl-(4')-methyl]-7-acetamino-1,2-dihydro-phthalazine hydrochloride are heated on the water bath for 3 hours with 100 cc. of phosphorus oxychloride. There is no apparent reaction. The suspension is poured onto 600 g. of ice, and the resulting clear solution is run, in a thin jet, into water which is kept constantly alkaline by the addition of 310 cc. of concentrated ammonia. The precipitated 1-chloro-4-[pyridyl-(4')-methyl]-7-acetamino-phthalazine is separated by filtering with suction, washed thoroughly and immediately boiled for 2 hours under reflux in a solution of 81 cc. of hydrazine hydrate in 90 cc. of methanol. The readily volatile portions are evaporated under reduced pressure. To remove the hydrazine hydrate, the rest is evaporated twice with 200 cc. of ethanol. The crystalline residue is dissolved in a little methanol, an insoluble product of high melting point removed, and the remainder concentrated by evaporation. There are obtained yellowish crystals of 1-hydrazino-4-[pyridyl-(4')-methyl]-7 - acetamino-phthalazine of the formula

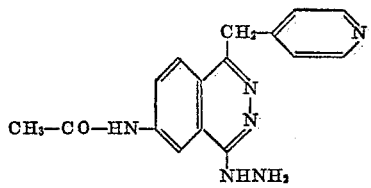

The product melts with foaming at 143–145° C., resolidifies at about 180° C. and does not melt again when heated up to 315° C.

The dihydrochloride prepared in ethanol with 2.5 N alcoholic hydrochloric acid melts at 264–267° C. It is hygroscopic. The product which contains water of crystallization melts at a lower temperature.

The starting material used in this example is prepared as follows:

The 5-nitro-γ-pyrophthalone obtained in known manner by heating 4-nitro-phthalic anhydride with γ-picoline in ortho-dichlorobenzene to 180° C. is refluxed with 4 times its quantity of hydrazine hydrate for 3 hours. In this operation, the nitro group is reduced and yellow-brown crystals of 1-oxo-4-[pyridyl-(4')-methyl]-7-amino-1,2-dihydro-phthalazine obtained which melts at 298° C. The hydrochloride melts, after recrystallization from ethanol, at above 300° C.

The phthalazone obtained is finely triturated and boiled for 3 hours in the 6-fold quantity of acetic anhydride. After cooling, the product is separated and dissolved in glacial acetic acid and mixed with 2,4 N alcoholic hydrochloric acid. The hydrochloride of 1-oxo-4-[pyridyl-(4')-methyl]-7-acetamino-1,2-dihydro-phthalazine which separates immediately is analytically pure and can be used as it is.

Example 4

2 g. of the 1-hydrazino-4-[pyridyl-(4')-methyl]-7-acetamino-phthalazine-dihydrochloride obtained as described in Example 3 is refluxed for 1½ hours in 50 cc. of concentrated hydrochloric acid and cooled. The precipitated product is the trihydrochloride of 1-hydrazino-4-[pyridyl-(4')-methyl]-7-amino-phthalazine of the formula

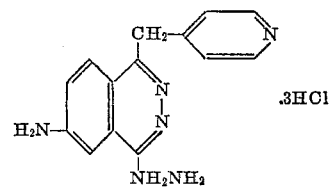

which on being dried or recrystallized readily gives off 1 mol of hydrochloric acid. It melts at 285° C.

What is claimed is:
1. 1-hydrazino-4-[pyridyl-(4')-methyl]-phthalazine.
2. 1-hydrazino-4-[pyridyl-(2')methyl]-phthalazine.
3. 1-hydrazino-4-[pyridyl-(4')-methyl]-7- acetylamino-phthalazine.
4. 1-hydrazino-4-[pyridyl-(4')-methyl]-7-amino-phthalazine.
5. The therapeutically acceptable acid addition salts of 1-hydrazino-4-[pyridyl-(4')-methyl]-phthalazine.
6. A member of the group consisting of compounds of the formula

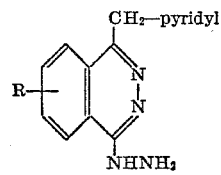

in which R represents a member of the group consisting of hydrogen, primary amino, lower alkanoylamino, nitro, lower alkyl, lower alkoxy and halogen, and therapeutically acceptable acid addition salts thereof.

7. The dihydrochloride of 1-hydrazino-4-[pyridyl-(4')-methyl]-phthalazine.

No references cited.